United States Patent
Breault

(10) Patent No.: US 7,381,489 B2
(45) Date of Patent: Jun. 3, 2008

(54) PEM FUEL CELL WITH HIGH POROSITY HYDROPHILIC WATER TRANSPORT PLATES AND TEMPERATURE INCREASE BEFORE SHUTDOWN IN ENVIRONMENT WHICH MAY REACH SUBFREEZING TEMPERATURES

(75) Inventor: Richard D. Breault, North Kingstown, RI (US)

(73) Assignee: UTC Power Corporation, South Windsor, CT (US)

( * ) Notice: Subject to any disclaimer, the term of this patent is extended or adjusted under 35 U.S.C. 154(b) by 10 days.

(21) Appl. No.: 10/633,917

(22) Filed: Aug. 4, 2003

(65) Prior Publication Data

US 2005/0031914 A1 Feb. 10, 2005

(51) Int. Cl.
*H01M 8/04* (2006.01)
(52) U.S. Cl. .............................. 429/22; 492/13; 492/20; 492/24
(58) Field of Classification Search .................. 429/13, 429/24, 26
See application file for complete search history.

(56) References Cited

U.S. PATENT DOCUMENTS

| 5,134,042 | A | * | 7/1992 | Madou et al. ................. 429/13 |
| 6,042,955 | A | * | 3/2000 | Okamoto ..................... 429/13 |
| 6,165,634 | A | * | 12/2000 | Krasij et al. ................... 429/35 |
| 6,197,442 | B1 | * | 3/2001 | Gorman ........................ 429/13 |
| 6,673,481 | B1 | * | 1/2004 | Reiser et al. ................. 429/13 |
| 6,777,116 | B1 | * | 8/2004 | Muller et al. ................. 429/15 |
| 2001/0004501 | A1 | * | 6/2001 | Yi et al. ........................ 429/34 |
| 2002/0071978 | A1 | * | 6/2002 | Bekkedahl et al. ........... 429/25 |

FOREIGN PATENT DOCUMENTS

WO    WO 01/48846    *   7/2001

* cited by examiner

Primary Examiner—Susy Tsang-Foster
Assistant Examiner—Cynthia Lee
(74) Attorney, Agent, or Firm—M. P. Williams

(57) ABSTRACT

A fuel cell stack (50) includes fuel cells (16, 18, 19) with anode and cathode water transport plates (23, 31, 34, 37) having porosity of at least 50%, thereby to significantly increase the amount of water stored within the water transport plates when the stack is shut down, which doubles the heat of fusion as the ice in the pores melts during a startup following freeze. This extends the period of time before the water in the pores reaches a hard freeze at –20° C. from 180 hours to 280 hours. A controller (60) controls the bypass (55) of a heat exchanger (54) to cause the temperature of the stack to reach a temperature sufficient to raise the sensible heat of the stack by 20%-40% above what it is with the fuel cell power plant operating steady state, prior to being shut down, thereby increasing the hours required for the fuel cell to cool down to 0° C. in –20° C. environment from 60 hours to 90 hours, allowing easier startups when shut down for less than 90 hours.

6 Claims, 5 Drawing Sheets

PEM FUEL CELL WITH HIGH POROSITY HYDROPHILIC WATER TRANSPORT PLATES AND TEMPERATURE INCREASE BEFORE SHUTDOWN IN ENVIRONMENT WHICH MAY REACH SUBFREEZING TEMPERATURES

TECHNICAL FIELD

This invention relates to a PEM fuel cell in which the water transport plates have a porosity of between 50% and 70%, and which is controlled to reach a temperature of between 80° C. and 90° C. before being shut down in an environment which can reach freezing temperatures.

BACKGROUND ART

The conventional wisdom related to starting fuel cells, particularly for automotive applications, when they have been subjected to freezing temperatures, is to heat the fuel cell prior to starting it, which means a significant delay before the vehicle can be operated.

As is described in U.S. patent application Ser. No. 10/390,439 filed Mar. 17, 2003, now U.S. Pat. No. 6,673,481, water in the porous water transport plates can reach or exceed freezing temperatures without doing damage to the water transport plates, primarily because of the small size of the pores therein. As is also disclosed in that application, the water that remains in the pores of the water transport plates aids in extending the period of time that a fuel cell can be operated during a startup at subfreezing temperatures before there is need to provide coolant to the fuel cell, or to operate the water management system of the fuel cell.

In PEM fuel cells which are designed for use in automotive applications, the use of insulation has heretofore not been a practical solution to the freezing of the fuel cells, nor to the starting of the fuel cells in a frozen condition when the fuel cells are subjected to subfreezing temperatures. This is because the volume of the fuel cell plus the volume of the insulation exceeds the volume which can be allocated for the power plant in an automotive application.

Other conventional wisdom has been to reduce the amount of water which remains in the power plant, thus to reduce the amount of water which has to be thawed and heated prior to operating of the fuel cell power plant.

PEM fuel cells that contain porous water transport plates can operate at high current densities at a cell temperature of 0° C. if the water in the water transport plate is not totally frozen. This is because the pressure of the oxidant air is sufficient to force product water through the porous water transport plate into the water channels associated with the water transport plate; and is sufficient to prevent flooding of the hydrophilic cathode support plate.

On the other hand, if the water in the porous water transport plates is totally frozen, i.e., a hard freeze, or if the fuel cell utilizes bi-polar separator plates that are solid, the product water is not easily removed, and low to moderate current densities must be maintained until the cells reach operating temperatures.

DISCLOSURE OF INVENTION

Objects of the invention include: maximizing the time that the fuel cell can be shut down in subfreezing conditions without experiencing temperatures below 0° C.; maximizing the time the fuel cell can be shut down in subfreezing conditions before water remaining in the porous water transport plates reaches a hard freeze; increasing the amount of time that a fuel cell can be operated during startup from subfreezing temperatures without the need for coolant circulation or water management; and operation of a fuel cell in a manner that permits a significant fraction of the water in the porous water transport plates to freeze before there is any need for corrective action, such as restarting the fuel cell stack or providing auxiliary heat to the fuel cell stack.

This invention is predicated in part on the concept that more water in the porous water transport plates means a greater amount of cooling to the fuel cell stack without circulation of coolant upon startup following a freeze. The invention is predicated in part on recognition of the fact that a fuel cell which is warmer when it is shut off will take longer to cool to a freezing temperature in a subfreezing environment.

According to the present invention, an insulated fuel cell stack is provided porous, hydrophilic water transport plates having porosity of at least 50%, which results in a minimal change in sensible heat of the cell but a major increase in the latent heat content of the cell, relative to the prior art whose porosity is between 25%-35%. The time it takes for the cell stack to cool down to 0° C. after shutdown is thereby increased, from about 90 hours with conventional porosity of about 30%, to a total of 110 hours for a cell stack with water transport plates having 60% porosity according to the invention. The amount of time for the water in the porous water transport plates of an insulated PEM fuel cell to reach a hard freeze is also increased, from about 180 hours for a conventional fuel cell having water transport plates having conventional porosity of about 30%, to about 280 hours for a PEM fuel cell operating with increased porosity according to the present invention.

In accordance further with the invention, prior to shut down of a fuel cell power plant, the average cell temperature is increased so as to increase the sensible heat in the fuel cell stack by between 20% and 40% above the sensible heat of the stack at the steady state operating temperature. For example, an insulated PEM fuel cell stack, operating near ambient pressure and normally having an average cell temperature of 65° C., is caused to achieve an average temperature of between 80° C. and 90° C. prior to initiating a shut down process in an environment which may reach subfreezing temperatures, which maximizes the sensible heat within the cell stack and coolant accumulator, if any, and increases the time for incipient freezing of the cell stack from about 60 hours to about 90 hours for cell stacks with 30% porosity water transport plates and proportionally greater for cell stacks with 60% porosity water transport plates.

Other objects, features and advantages of the present invention will become more apparent in the light of the following detailed description of exemplary embodiments thereof, as illustrated in the accompanying drawing.

MODE(S) FOR CARRYING OUT THE INVENTION

Figure 1:
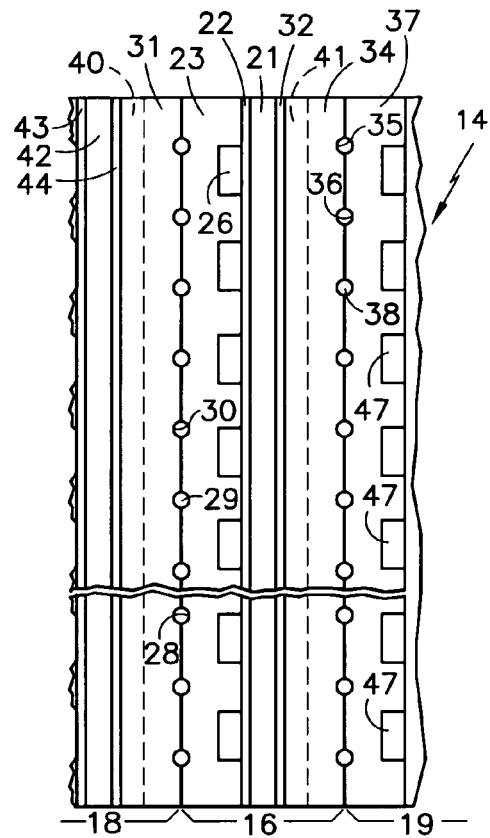
FIG. 1 is a stylized, simplified side elevation sectional view, with sectioning lines omitted for clarity, of a fuel cell and portions of adjacent fuel cells, which may be modified to have water transport plates with increased porosity, and be operated to be shut down from increased temperature, in accordance with the invention.

In FIG. 1, a fuel cell stack 14 has fuel cells; only a fuel cell 16 and portions of adjacent fuel cells 18, 19 are shown. The fuel cell 16 comprises a membrane electrode assembly 21 which includes a proton exchange membrane together with cathode and anode catalysts. An anode support plate 22 is adjacent to a porous anode water transport plate 23, which includes fuel flow field passages 26 and grooves 28 which make up coolant water passageways 29 when matched with grooves 30 on an adjacent cathode water transport plate 31. Similarly, a cathode support plate 32 is adjacent to a porous cathode water transport plate 34 which has grooves 35 which will form water passages 38 when matched with grooves 36 of an additional anode water transport plate 37 of the next fuel cell 19. In many fuel cells, the grooves are only in one of the water transport plates, the water transport plate adjacent thereto being flat. The cathode water transport plate 31 of the cell 18 has oxidant reactant gas passages 40, and the cathode water transport plate 34 has oxidant reactant gas flow field passages 41. Although the reactant gas flow fields 26, 47 and 40, 41 are formed, in the embodiment of FIG. 1, within the water transport plates 23, 31, 34, 37, they may be formed in other plates as well. The fuel cell 18, only partially shown, includes a membrane electrode assembly 42, an anode support plate 43, and a cathode support plate 44, the remainder of this fuel cell being broken away for simplicity.

As is disclosed, in U.S. patent applications Ser. No. 10/012,157 and 09/733,133 filed Nov. 28, 2001 and Dec. 8, 2000, respectively, the degree of hydrophilicity and hydrophobicity, as well as the size of pores in the water transport plates 23, 34 control the passage of water from the channels 29 toward the anode 22, and prevents the passage of fuel through the water transport plate 23 into the oxidant reactant flow field 40 of the water transport plate 31 in the adjacent fuel cell 18; Similarly, removal of product water from the cathode 32 into the water flow channels 38 and prevention of oxidant reactant gas, such as air, from flowing through the water transport plate 34 to the fuel flow channels 47 of the adjacent fuel cell 19 is controlled by the hydrophilicity, hydrophobicity, and size of the pores in the cathode water transport plate 34.

The water transport plates 23, 31, 34, 37 are typically porous graphite having a mean pore size of approximately two to three microns. It is preferable to make the water transport plates 23, 31, 34, 37 hydrophilic by treating them with tin oxide ($SnO_2$) such as described In U.S. Pat. No. 5,840,414. The hydrophilic porous nature of the cathode water transport plate 23, in conjunction with a negative pressure differential between the coolant and oxidant reactant gas streams, ensures proper removal of the product water formed at the cathode. In accordance with one aspect of the invention, the porosity of a fuel cell water transport plate is increased from about 30%, as is conventional, to at least 50%, meaning that at least 50% of the volume of the water transport plate comprises pores, whereas 50% or less of the volume is the structural material.

Sensible heat herein refers to the quantity of heat exchanged between the controlled operating temperature of the stack and 0° C., or between a higher temperature of the invention and 0° C. The sensible heat of a water transport plate is the sum of the sensible heat of the graphite that forms the structure of the water transport plate and the sensible heat of the water that occupies the porosity of the water transport plate.

Figure 2:
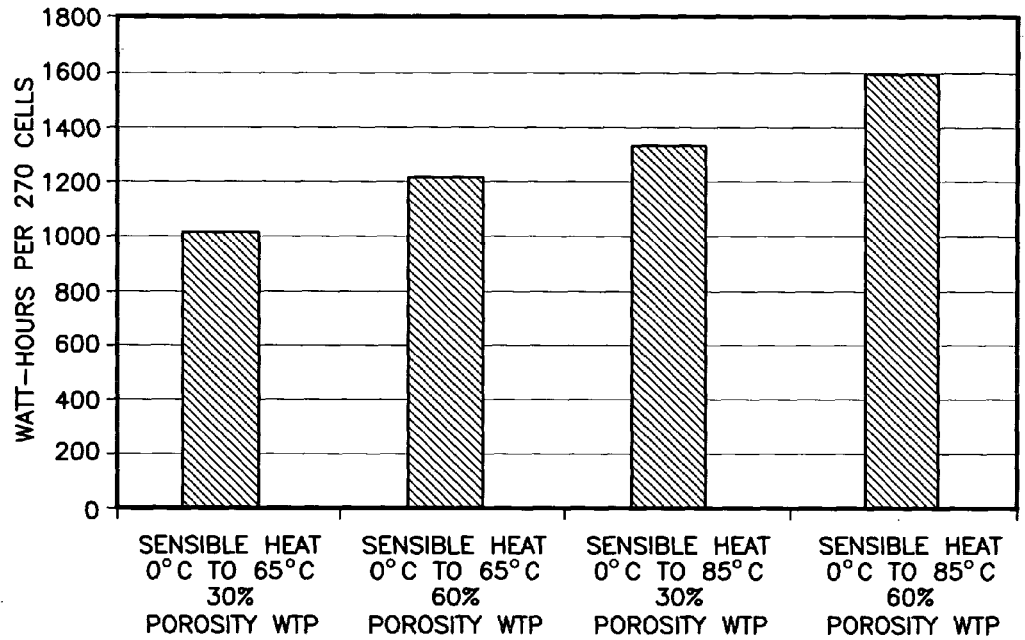
FIG. 2 is a bar chart illustrating sensible heat contents of cells having water transport plates of conventional porosity of about 30% and of increased porosity of about 60% in accordance with the present invention.

As seen in FIG. 2, the sensible heat required to raise a fuel cell from 0° C. to 65° C. with 60% porosity water transport plates is not much higher, about 20%, than the sensible heat required to raise a similar fuel cell with conventional 30% porosity water transport plates from 0° C. to 65° C. Also shown in FIG. 2, there is about an 18% increase in the sensible heat required to raise a 60% porosity water transport plate from 0° C. to 85° C. compared with the sensible heat required to raise a conventional water transport plate of 30% porosity from 0° C. to 85° C. Thus, the increase in sensible heat which can be stored in a fuel cell during a sub-freezing shut down compared to prior art, in the form of water and graphite which must be heated up, is only improved over the prior art by 20%-60% depending upon the starting or final temperature and the porosity of the water transport plate.

Figure 3:
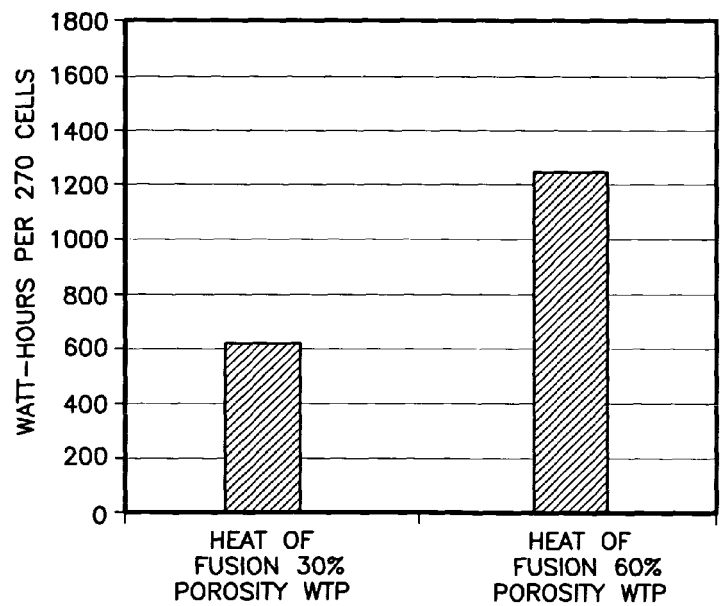
FIG. 3 is a bar chart of the latent heat of freezing content of cells having water transport plates of conventional porosity of about 30% and having water transport plates with increased porosity of about 60% in accordance with the present invention.

On the other hand, reference to FIG. 3 illustrates that there is a 100% increase in heat of fusion of the ice within a water transport plate having 60% porosity compared with that of a water transport plate having 30% porosity. This is significant, and an important aspect of the present invention. Thus, doubling the porosity from that in conventional use will double the heat of fusion, and therefore the amount of cooling that can be derived from the water transport plates in a fuel cell when it is being cold started.

Figure 4:
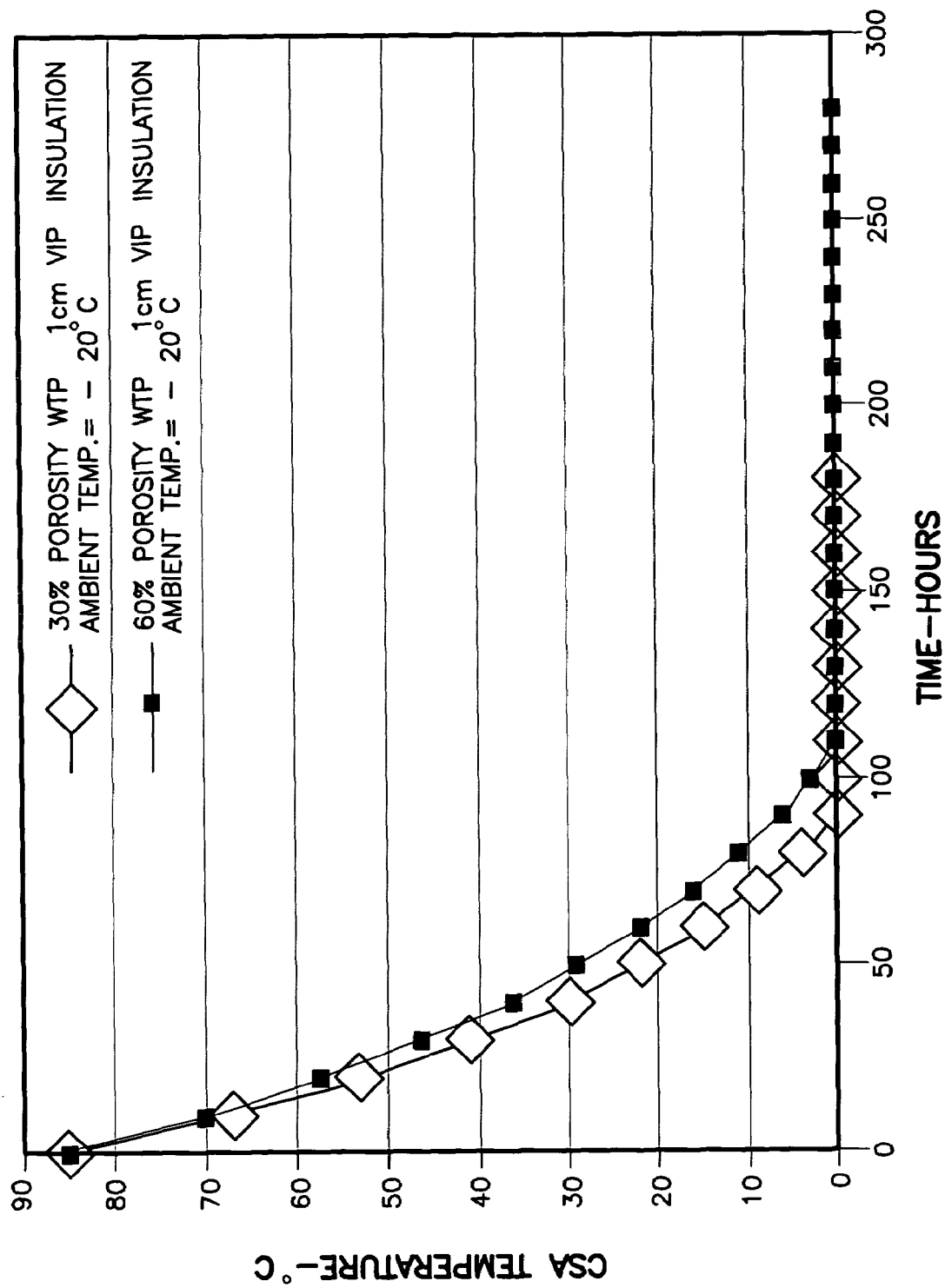
FIG. 4 is a chart illustrating time required to cool and freeze insulated PEM fuel cells with conventional porosity of about 30% and with increased porosity of about 60%, in the porous water transport plates.

Referring to FIG. 4, the temperature of a fuel cell stack when originally heated to 85° C. and then subjected to an environment of −20° C. is plotted for a fuel cell stack having 30% porosity water transport plates, and for a fuel cell stack having 60% porosity water transport plates.

The cell stack in these examples is insulated on all six faces with one centimeter vacuum insulation panels having a thermal conductivity of four milliwatts per meter-degree Kelvin. The known vacuum insulation panels are super efficient insulators that have a thermal conductivity of 2.5-7.5 milliwatts per meter-degree Kelvin.

Although there is not too much difference between the time at which the fuel cells will reach 0° C., there is a significant difference in the time before the water within the pores of the water transport plates will totally freeze, which is a so-called "hard freeze". For instance, with water transport plates having 30% porosity, the fuel cell will reach 0° C. in 90 hours, and will reach a hard freeze in 180 hours. The fuel cell having water transport plates with 60% porosity will reach 0° C. in 110 hours, but will not achieve a hard freeze until 280 hours. This is a 55% increase in the length of time that it takes to subject a fuel cell to a hard freeze after shutting it off, when it has been heated to 85° C. just prior to shut off. This is significant, and an important aspect of the present invention.

Figure 5:
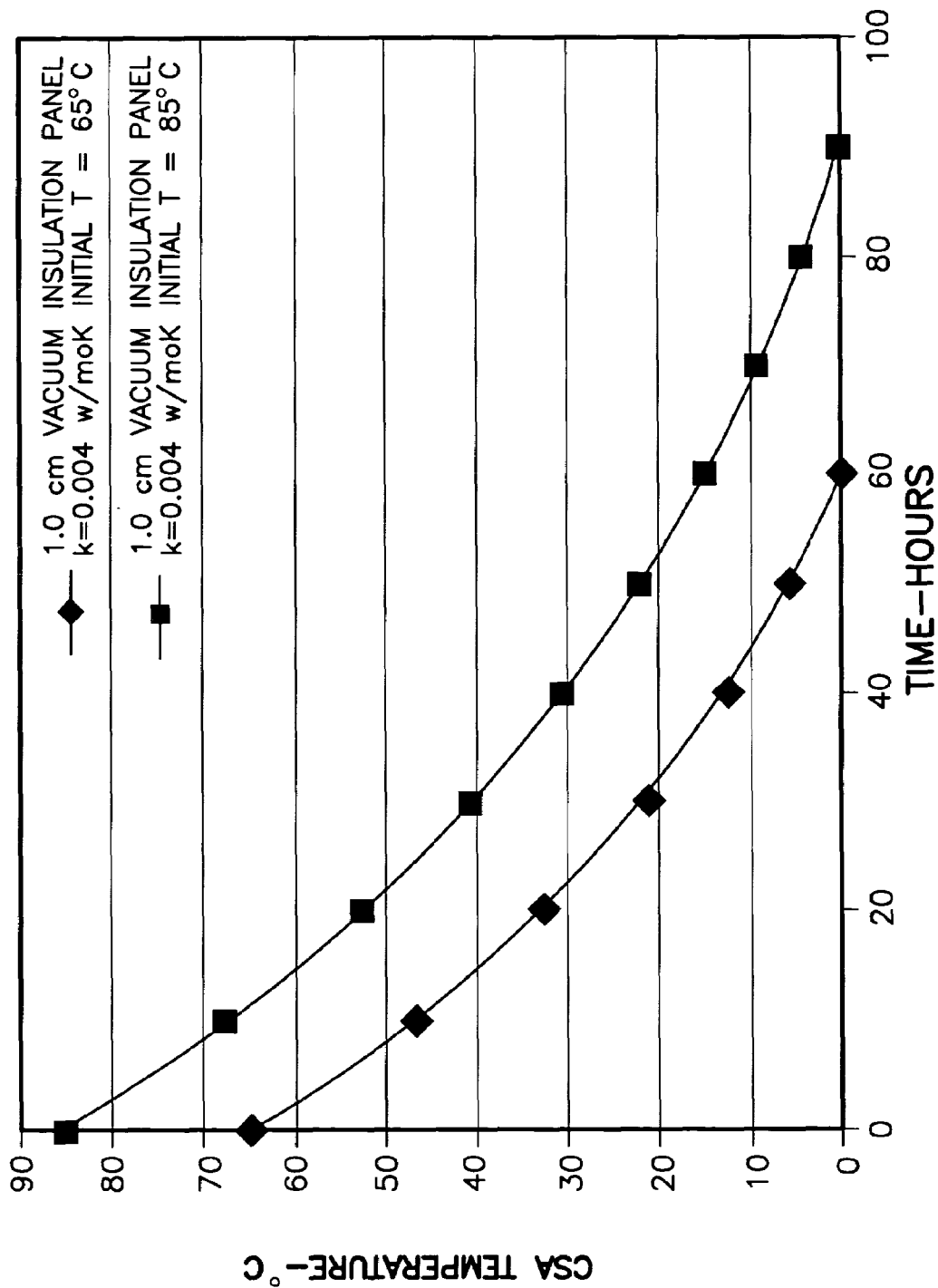
FIG. 5 is a graph illustrating the time it takes to cool an insulated PEM fuel cell to 0° C. in an environment of −20° C. when it is shut down at a temperature of 65° C. and at a temperature of 85° C.

Another aspect of the present invention is illustrated in FIG. 5, with respect to a fuel cell stack having water transport plates of 30% porosity and containing the same insulation as above. Therein, the lower trace illustrates the time required for a fuel cell stack to reach 0° C. when subjected to an ambient of −20° C. when it is initially heated to 65° C. at the time of shut down. In contrast, the upper trace illustrates the time required for a fuel cell stack to reach 0° C. when subjected to an ambient −20° C. when it is shut down, having been initially heated to 85° C. The difference is a 50% increase in the length of time that a fuel cell stack can remain shut down at −20° C. before reaching freezing temperature when it is heated to 85° C. instead of shut down at a normal operating temperature of around 65° C. This too is significant and is an important aspect of the present invention.

Figure 6:
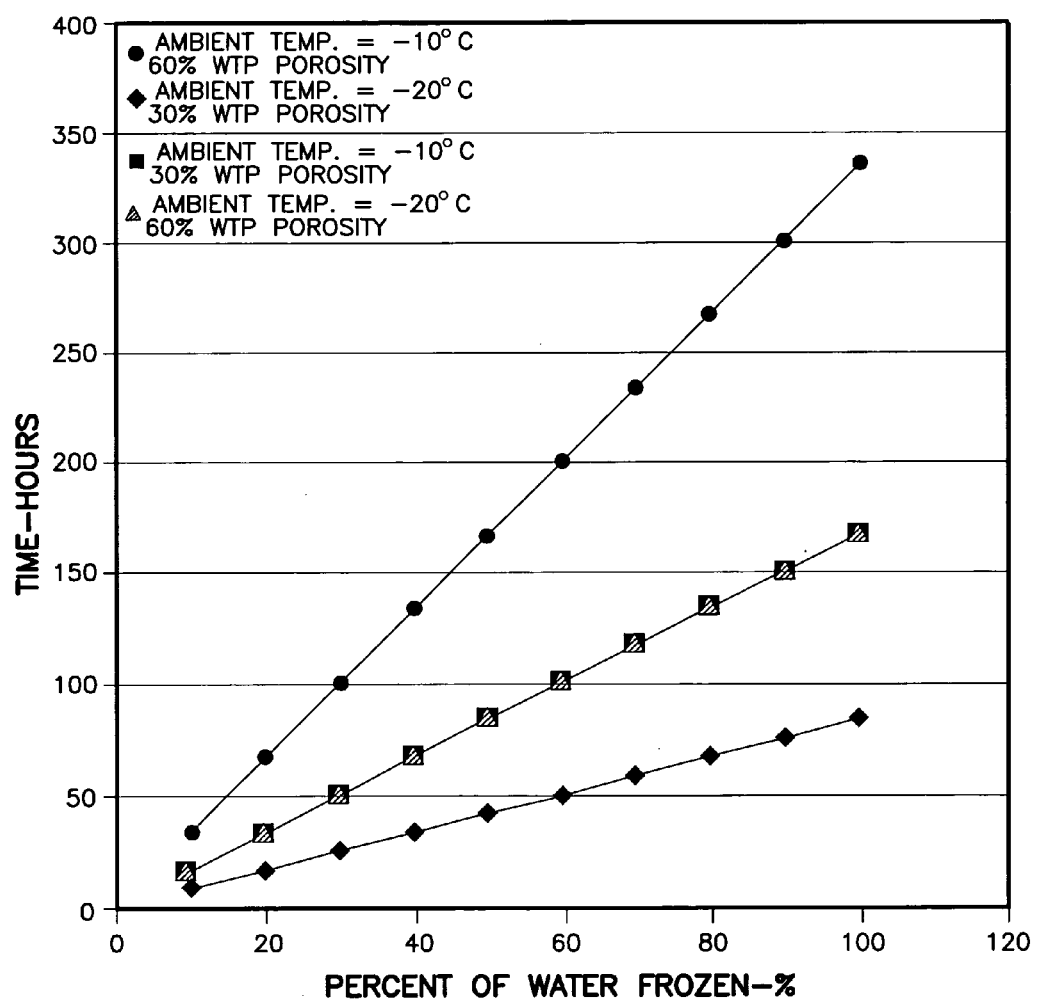
FIG. 6 is a graph illustrating percent of water in the water transport plates that is frozen over time for various ambient temperatures and porosities.

FIG. 6 shows the percent of water within the water transport plates that is frozen as a function of time. The time begins when the cell stack is cooled to 0° C. Cases are presented for water transport plate porosities of 30% and 60% and ambient temperature of −10° C. and −20° C. Doubling the porosity of the water transport plate doubles the time required to achieve a hard freeze of the water in the water transport plates. Halving the temperature gradient for cooling (from −20° C. to −10° C.) also doubles the time to achieve a hard freeze.

Figure 7:
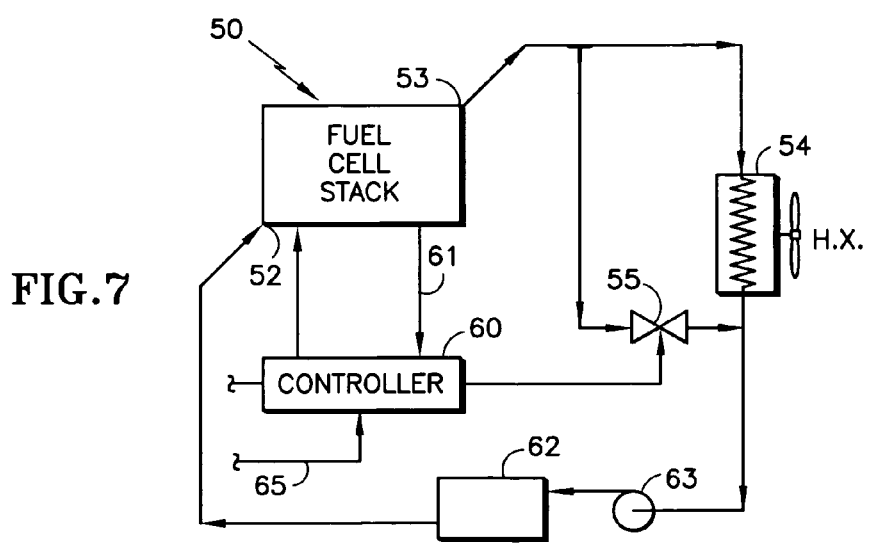
FIG. 7 is a simplified block diagram of a portion of a fuel cell power plant, including the manner of controlling the temperature of the fuel cell stack at shut down, in an environment which may reach subfreezing temperatures.

Referring now to FIG. 7, the fuel cell stack 50 may include about 300 cells similar to the cells 16, 18 and 19 in FIG. 1, and may have a water management system in which water enters the water inlet manifold 52, exits a water exit manifold 53, and traverses either through a heat exchanger 54 or a bypass valve 55. The bypass valve 55 can be selectively opened to a varying degree in response to a controller 60 which may receive temperature information over a line 61 from the stack 50. A water pump 63 will cause circulation of water through the stack and the heat exchanger. There may be an accumulator 62, a device in which fluid is collected, in some systems. The controller 60, can receive an input signal, such as on a line 65 to indicate when the stack is about to be shut down in an environment which may reach subfreezing temperatures, and prior to shut down, cause the valve 55 to bypass sufficient water around the heat exchanger 54 so as to allow the average temperature of the stack 50 to reach a temperature, sufficient to raise the sensible heat of the fuel cell stack by 20% to 40% above the sensible heat of the fuel cell stack when said fuel cell power plant is operating at normal operating temperature, such as of between 80° C. and 90° C. as described hereinbefore. Thus, the results shown by the upper trace in FIG. 5 may be achieved thereby.

The invention is best used with a highly insulated fuel cell stack, but proportional benefits are achieved with any degree of insulation.

While it is preferable to use all of the various aspects of the invention together in many cases, it is possible that in some cases less than all aspects of the invention may be used with any particular sort of fuel cell stack.

All of the aforementioned patent applications are incorporated herein by reference.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

I claim:

1. A method of operating a fuel cell power plant in which each fuel cell of a stack includes a membrane electrode assembly having a proton exchange membrane between a cathode catalyst and an anode catalyst, an anode support plate adjacent said anode catalyst, a cathode support plate adjacent said cathode catalyst, said method comprising:
   providing, in each cell a fuel reactant gas flow field adjacent to one of said anode support plates, and providing, in each cell, an oxidant reactant gas flow field adjacent to one of said cathode support plates, at least one of said fuel reactant gas flow field and said oxidant reactant gas flow field in each cell comprising a porous, hydrophilic water transport plate with a porosity of at least 50%, the pores of which contain water when said power plant is shut down, at least one said water transport plate in each cell having water flow channels;
   providing an indication that said power plant is about to be shut down; and
   in response to said indication, causing said fuel cell stack to achieve, prior to shutdown, a temperature either (a) at which the sensible heat of said fuel cell stack is 20% to 40% above the sensible heat of the fuel cell stack when said fuel cell power plant is operating at normal operating temperature, or (b) between 15° C. and 25° C. above the temperature of the fuel cell stack when said fuel cell power plant is operating at normal operating temperature.

2. A method of operating a fuel cell power plant in which each fuel cell of a stack includes a membrane electrode assembly having a proton exchange membrane between a cathode catalyst, a cathode support plate adjacent said cathode catalyst, said method comprising:
   providing, each cell, a fuel reactant gas flow field adjacent to one of said anode support plates, and providing, in each cell, an oxidant reactant gas flow field adjacent to one of said cathode support plates, at least one of said fuel reactant gas flow field and said oxidant reactant gas flow field in each cell comprising a porous, hydrophilic water transport plate, at least one said water transport plate in each cell having water flow channels;
   providing an indicationthat said power plant is about to be shut down; and
   in response to said indication, causing said fuel call stack is 20% to 40% above the sensible heat of the fuel cell stack when said fuel cell power plant is operating at normal operating temperature.

3. A fuel cell power plant, comprising:
   a stack of fuel cells, each fuel cell including a membrane electrode assembly having a proton exchange membrane between a cathode catalyst and an anode catalyst, an anode support plate adjacent said anode catalyst, a cathode support plate adjacent said cathode catalyst, a fuel reactant gas flow field adjacent to said anode support plate, and an oxidant reactant gas flow field adjacent said cathode support plate, at least one of said fuel reactant gas flow field and said oxidant reactant gas flow field in each cell comprising a porous, hydrophilic water transport plate with a porosity of at least 50%, the pores of which contain water when said power plant is shut down, at least one said water transport plate in each cell having water flow channels;
   means for providing an indication that said fuel cell power plant is about to be shut down; and means responsive to said indication for causing said fuel cell stack to achieve, prior to shutdown, a temperature either (a) at which the sensible heat of said fuel cell stack is 20% to 40% above the sensible heat of the fuel cell stack when said fuel cell power plant is operating at normal operating temperature, or (b) between 15° C. and 250° C. above the temperature of the fuel cell stack when said fuel cell power plant is operating at normal operating temperature.

4. A fuel cell power plant, comprising:

a stack of fuel cells, each fuel cell including a membrane electrode assembly having a proton exchange membrane between a cathode catalyst and an anode catalyst, an anode support plate adjacent said anode catalyst, a cathode support plate adjacent said cathode catalyst, a fuel reactant gas flow field adjacent to said anode support plate, and an oxidant reactant gas flow field adjacent said cathode support plate, at least one of said fuel reactant gas flow field and said oxidant reactant gas flow field in each cell comprising a porous, hydrophilic water transport plate, at least one said water transport plate in each cell having water flow channels;

means for providing an indication that said fuel cell power plant is about to be shut down; and means responsive to said indication for causing said fuel cell stack to achieve, prior to shutdown, a temperature at which the sensible heat of said fuel cell stack is 20% to 40% above the sensible heat of the fuel cell stack when said fuel cell power plant is operating at normal operating temperature.

5. A fuel cell power plant, comprising:

a stack of fuel cells, each fuel cell including a membrane electrode assembly having a proton exchange membrane between a cathode catalyst and an anode catalyst, an anode support plate adjacent said anode catalyst, a cathode support plate adjacent said cathode catalyst, a fuel reactant gas flow field adjacent to said anode support plate, and an oxidant reactant gas flow field adjacent said cathode support plate, at least one of said fuel reactant gas flow field and said oxidant reactant gas flow field in each cell comprising a porous, hydrophilic water transport plate, at least one said water transport plate in each cell having water flow channels;

means for providing an indication that said fuel cell power plant is about to be shut down; and means responsive to said indication for causing said fuel cell stack to achieve, prior to shutdown, a temperature between 15° C. and 25° C. above the temperature of the fuel cell stack when said fuel cell power plant is operating at normal operating temperature.

6. A method of operating a fuel cell power plant in which each fuel cell of a stack includes a membrane electrode assembly having a proton exchange membrane between a cathode catalyst and an anode catalyst, an anode support plate adjacent said anode catalyst, a cathode support plate adjacent said cathode catalyst, said method comprising:

providing, in each cell, a fuel reactant gas flow field adjacent to one of said anode support plates, and providing, in each cell, an oxidant reactant gas flow field adjacent to one of said cathode support plates, at least one of said fuel reactant gas flow field and said oxidant reactant gas flow field in each cell comprising a porous, hydrophilic water transport plate, at least one said water transport plate in each cell having water flow channels;

providing an indication that said power plant is about to be shut down; and in response to said indication, causing said fuel cell stack to achieve, prior to shutdown, a temperature between 15° C. and 25° C. above the temperature of the fuel cell stack when said fuel cell power plant is operating at normal operating temperature.

* * * * *